United States Patent [19]
Tharpe

[11] Patent Number: 5,887,699
[45] Date of Patent: Mar. 30, 1999

[54] SYSTEM AND METHOD FOR CONVEYING AND SORTING ARTICLES

[76] Inventor: John M. Tharpe, 2606 Northgate, Albany, Ga. 31707

[21] Appl. No.: 22,912

[22] Filed: Feb. 12, 1998

Related U.S. Application Data

[63] Continuation of Ser. No. 978,318, Nov. 20, 1992, abandoned.

[51] Int. Cl.⁶ .............................. B65G 37/00; B07C 9/00
[52] U.S. Cl. ............... 198/367; 198/370.02; 198/370.09; 198/637; 209/540; 209/657; 209/916
[58] Field of Search ..................................... 209/540, 583, 209/657, 916, 917; 198/367, 367.1, 367.2, 370.01, 370.02, 370.07, 370.09, 370.1, 411, 442, 637

[56] References Cited

U.S. PATENT DOCUMENTS

| | | | |
|---|---|---|---|
| 3,198,308 | 8/1965 | Driesch et al. | 198/370.07 X |
| 3,645,391 | 2/1972 | Hirakawa et al. | 209/583 X |
| 4,509,636 | 4/1985 | Godbois | 198/370.09 |
| 4,598,815 | 7/1986 | Adama | 198/370.09 |
| 4,643,291 | 2/1987 | Counter et al. | 198/367 X |
| 5,217,104 | 6/1993 | Pelletier | 198/367 |

FOREIGN PATENT DOCUMENTS

| | | | |
|---|---|---|---|
| 314881 | 5/1989 | European Pat. Off. | 198/367 |

*Primary Examiner*—Tuan N. Nguyen
*Attorney, Agent, or Firm*—Allen, Dyer, Doppelt, Milbrath & Gilchrist, P.A.

[57] ABSTRACT

Articles are conveyed along a primary conveyor in a first direction, and are moved rapidly onto a selected one of a plurality of sorting conveyors closely packed and extending generally lateral to the primary conveyor by rotating the articles so that a portion of each rotated article extends across the side of the primary conveyor to be frictionally engaged on the sorting conveyor for rapid movement away from the primary conveyor.

2 Claims, 4 Drawing Sheets

SYSTEM AND METHOD FOR CONVEYING AND SORTING ARTICLES

This is a continuation of application Ser. No. 07/978,318 filed Nov. 20, 1992, now abandoned.

BACKGROUND OF THE INVENTION

1. Field of the Invention

The present invention relates generally to conveying systems and methods, and in particular to conveying systems and methods which are capable of identifying individual articles being conveyed along a primary conveyor and sorting selected articles for distribution along secondary conveyors extending in a direction lateral to the primary conveyor.

2. Description of Background Art

There are a wide variety of conveying techniques in the prior art. From time to time, it is necessary to re-orient articles moving along a conveyor. To that end, the prior art has devised a number of ways for effectuating the rotation of articles being moved along a conveyor. For example, in U.S. Pat. No. 3,128,868 to Bowen, there is disclosed a fixed turning device positioned along the conveyor and extending across only a portion of the conveyor, to engage a front corner of each conveyed article to thereby rotate the article and change its orientation relative to the direction of conveyance. U.S. Pat. No. 4,085,839 to Crawford likewise discloses a fixed plate located along the path of the conveyor, for laterally displacing the conveyed articles onto a second conveyor extending generally parallel with the first conveyor.

Carlson et al in U.S. Pat. No. 3,918,575 disclose a hydraulically-actuated arm useful in a pallet-loading system, for changing the orientation of each article prior to movement of the article onto a secondary conveyor extending laterally relative to the first conveyor.

Other prior art techniques for changing the direction of an article being conveyed are disclosed in U.S. Pat. Nos. 2,835,370 to Warrington; 2,649,187 to Eggleston; 3,104,755 to Zuercher; 1,729,671 to Bell-Irving et al; 3,093,236 to McLaughlin; and 4,711,357 to Langenbeck et al. It is also known to effectuate article movement from a primary conveyor to lateral sorting conveyors using a hydraulic ram located at each sorting station. However, those techniques cause a significant shock to the article, and thus create a risk of damage.

There is a need in the conveying art for permitting the rapid sorting of articles along a primary conveyor onto a plurality of adjacent sorting conveyors in a manner which permits the sorting conveyors to be displaced along the primary conveyor in a highly dense organization without damage to the conveyed articles. In that connection, it is also desirable to automatically identify each article as it passes along the primary conveyor for purposes of determining which sorting conveyor the article is to be directed.

SUMMARY OF INVENTION

The present invention has as its principal objects to provide those features described above which are needed in the conveying art. To that end, the present invention contemplates a method and a related system for conveying and sorting articles passing along a primary conveyor in a first direction, and with a plurality of sorting conveyors being positioned generally lateral to the first direction and alongside the primary conveyor. To accomplish these objectives, each article travelling along the first direction on the primary conveyor is rotated so that a portion of each rotated article extends across the side of the primary conveyor and across the feed end of a selected one of the sorting conveyors, and thereafter the rotated article is conveyed along the selected sorting conveyor. Generally, this rotation is achieved by rotating each article about an axis extending generally normal to the primary conveyor, and which axis is faced from the center line toward a side of the primary conveyor opposite the side where the selected sorting conveyor is located.

To rapidly move each article being rotated off of the primary conveyor and onto the selected sorting conveyor, the sorting conveyor is provided with a frictional surface at the feed end and which lies in a plane slightly elevated with respect to the plane of the primary conveyor and moving in a direction and speed so as to rapidly draw the article being rotated across the adjacent side of the primary conveyor and onto the secondary conveyor in a quick motion, and avoid any interference with oncoming articles which are to move along the primary conveyor to another sorting station further downstream.

In order to achieve the rotating function, there is provided a plurality of extensible arms which are spaced along a side of the primary conveyor opposite the one side where the spaced sorting conveyors are located. The arms are alternately extended laterally across only a portion of the primary conveyor so as to engage only a portion of the front surface of each article with the arm, to thereby effectuate the rotation of the article on the primary conveyor at that sorting station immediately adjacent the selected sorting conveyor. The desired arm to be operated for a particular article to be moved along a selected sorting conveyor is identified by using a coded sticker containing a bar code or similar readable feature, which is attached to each article moving along the primary conveyor in the first direction. The stickers are read (as by a bar code reader) at an upstream evaluation station as the articles move along the primary conveyor; means at the evaluation station also identify the forward edge of each article, so that an appropriate control signal is generated for providing an input to control the operation of the rotating arms. Operation of the desired rotating arm is initiated a predetermined distance between the point of detection of the front edge of the corresponding article passing through the evaluation station and the corresponding arm.

The system and method of the present invention is particularly useful in the conveying and sorting of articles such as boxes used with fresh fruit and similar containers, in which each box has a lengthwise dimension which is greater than a cross-width dimension generally lateral to the lengthwise dimension. When used with articles of this type, the primary conveyor is dimensioned lateral to the first direction so that the articles fit within the sides of the primary conveyor when travelling with the lengthwise dimension generally parallel to the first direction, but with the lateral dimension of the primary conveyor being less than the lengthwise dimension of the articles. Thus, when each article is rotated while travelling along the first direction of the primary conveyor, the lengthwise dimension of each rotated article is then extended lateral to the first direction so that a rearward portion of the article extends across a first side of the primary conveyor and immediately onto the feed end of the sorting conveyor. Preferably, the frictional surface comprises a rotating wheel at the feed end of each sorting conveyor which is being driven at a rapid rotational rate, and which has a highly frictional surface.

After rotation on the primary conveyor and movement onto the selected secondary, sorting conveyor, the article has been rotated by 90° so that the end of each article which was faced rearwardly while moving along the primary conveyor is now facing downstream on the sorting conveyor.

DETAILED DESCRIPTION OF PREFERRED EMBODIMENT

Figure 1:
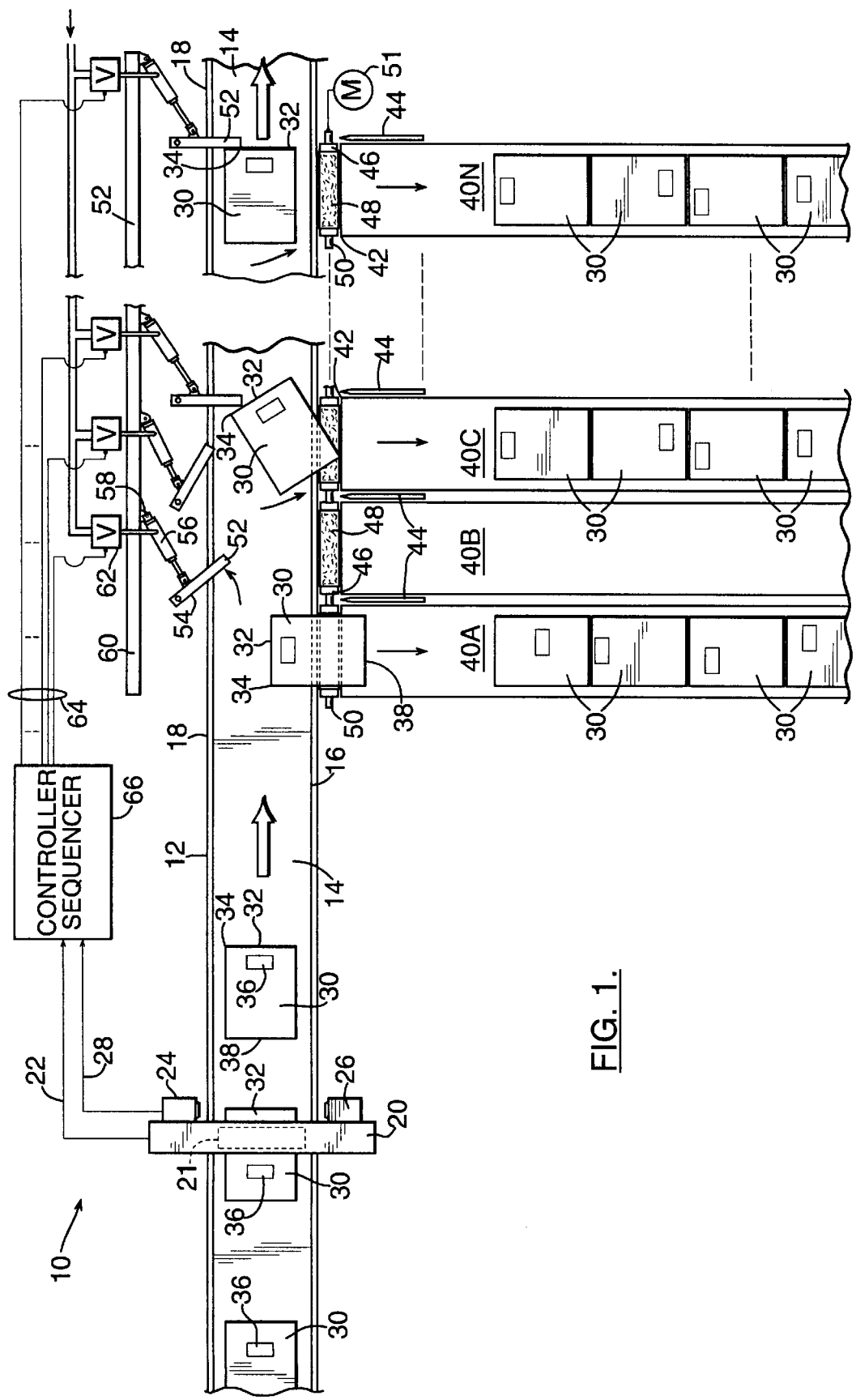
FIG. 1 is a top plan, schematic illustration of the conveying system of the present invention.

The conveying and sorting system of the present invention, and its associated method, will now be described with reference to FIG. 1 where the entire system is referred to generally by the reference numeral 10.

The system 10 includes a primary conveyor 12 having a conveying belt 14 and opposing fixed sides 16, 18. As will be described in greater detail below, there are a number of sorting stations located downstream along the primary conveyor 12; in order to determine which sorting station is to be utilized with a particular article passing along the primary conveyor, there is provided an evaluation station 20 located upstream from the sorting stations a fixed, known distance from each extensible arm 52, described in greater detail below. The evaluation station 20 includes a bar code reader 21 and a front edge indicator comprised of opposing radiation emitter 26 and receiver 24, which together provide inputs 22 and 28 into a controller and sequencer 66 described in greater detail below. It will of course be understood by those skilled in the art that the output 22 of the bar code reader 21 provides an indication as to which sorting conveyor a particular article moving along the primary conveyor 12 is to be directed, and an indication of the time at which the front edge of the article past a fixed point defined by the energy beam of the detectors 24, 26 and indicated as input 28.

The articles passing along the primary conveyor are depicted in FIG. 1 as boxes 30 having a front end 32, a front, left-hand corner 34, and a rearward end 38. (Those boxes 30 shown in various stages of rotation in the right-hand portion of FIG. 1 are depicted by lines only, so that the manner of operation of the system 10 may be better illustrated.)

Reference is now made to the right-hand portion of FIG. 1, where there is shown a plurality of sorting conveyors 40A–40N, each sorting conveyor including a forward, feed end 42 extending adjacent to a first one of the sides 16 of the primary conveyor 12. A fixed guide 44 is positioned between adjacent feed ends 42 of the sorting conveyors 40A–40N.

Figure 2:
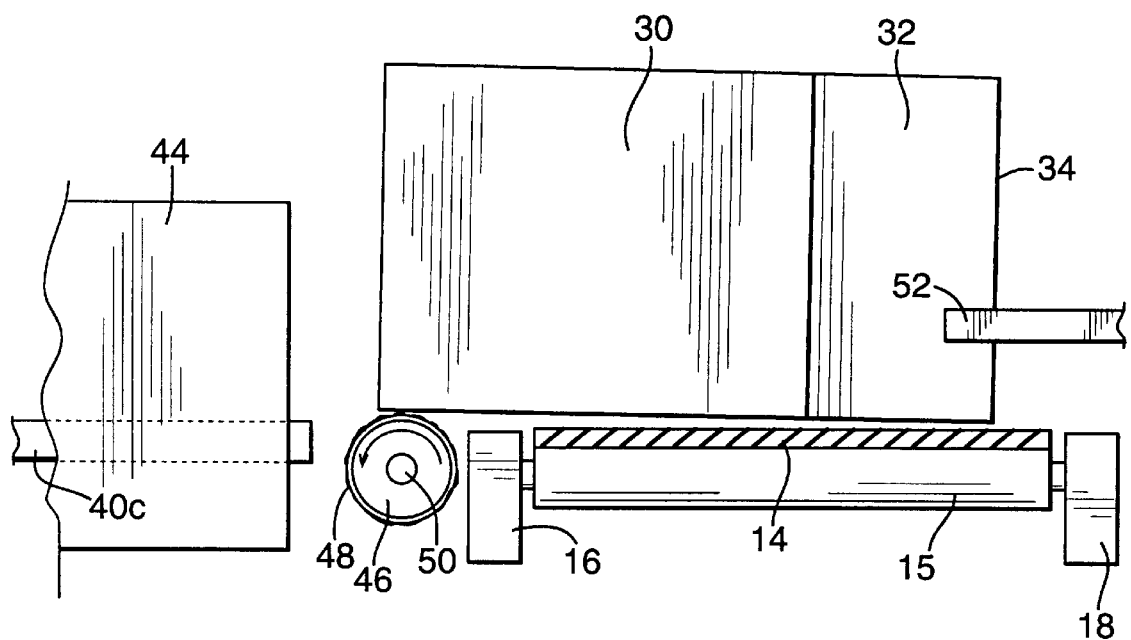
FIG. 2 is a cross-sectional view of a portion of the system illustrated in FIG. 1, taken along the lines 2—2.
Figure 3:
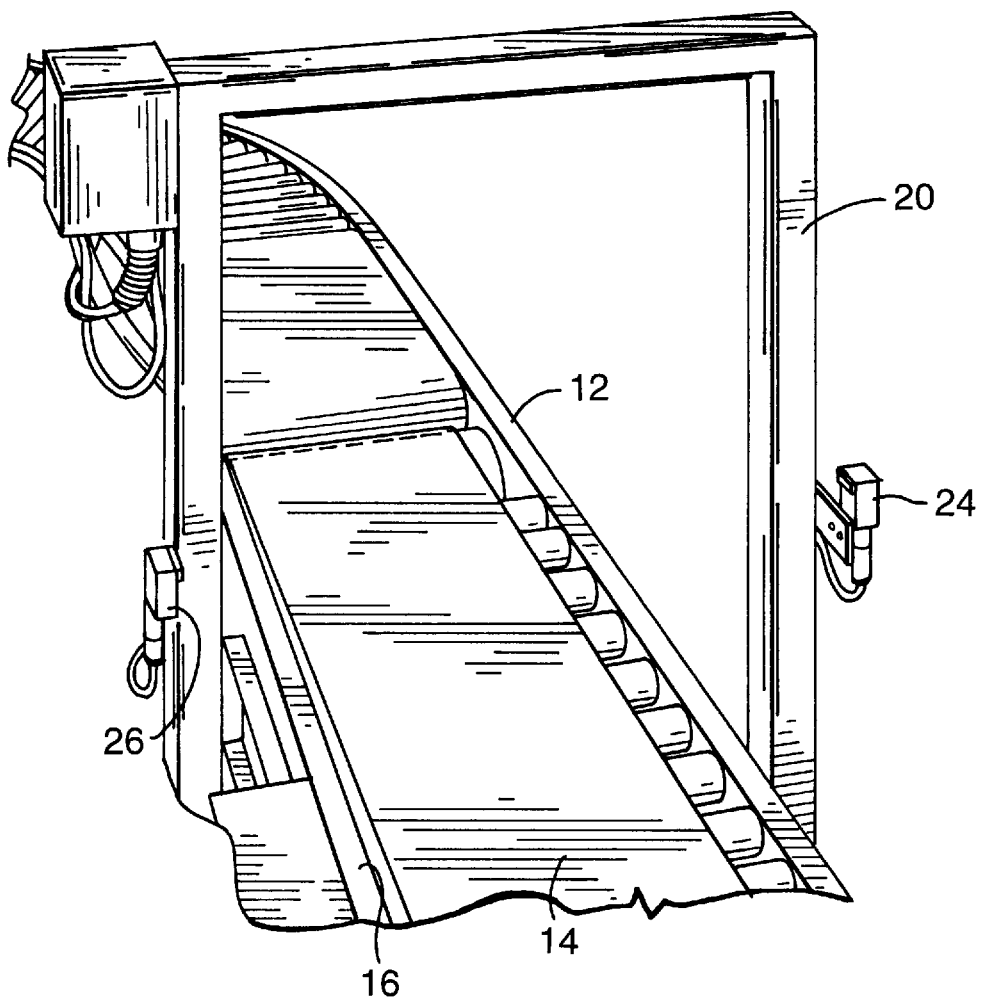
FIG. 3 is a perspective view illustrating the evaluation station located upstream along the primary conveyor.

In accordance with the present invention, there is provided between the feed ends 42 of the sorting conveyors 40A–40N and the adjacent side 16 of the primary conveyor a feed roller 46 having a high-friction surface 48, all of which are driven by a common shaft 50 from a motor 51. Preferably, the dimension of the frictional roller 46 and the speed of the motor 51 is selected so as to achieve a much higher rate of movement of rotated boxes across the first side 16 and onto the associated sorting conveyor 40A–40N than the rate of movement of the boxes 30 along the primary conveyor 12. By way of example, the primary conveyor has a nominal rate of 200 feet per minute, and the frictional roller has a linear (surface) speed of 500 feet per minute. Further, as is shown in FIG. 2, the frictional roller 46 is displaced relative to the side 16 of the primary conveyor 12 such that the upper extremity of the frictional roller 46 lies in a plane slightly elevated with respect to the plane of the belt 14 of the primary conveyor 12, to further enhance the ability of the frictional roller 46 to rapidly draw the rotating boxes (or other articles) off of the primary conveyor 12.

Figure 4:
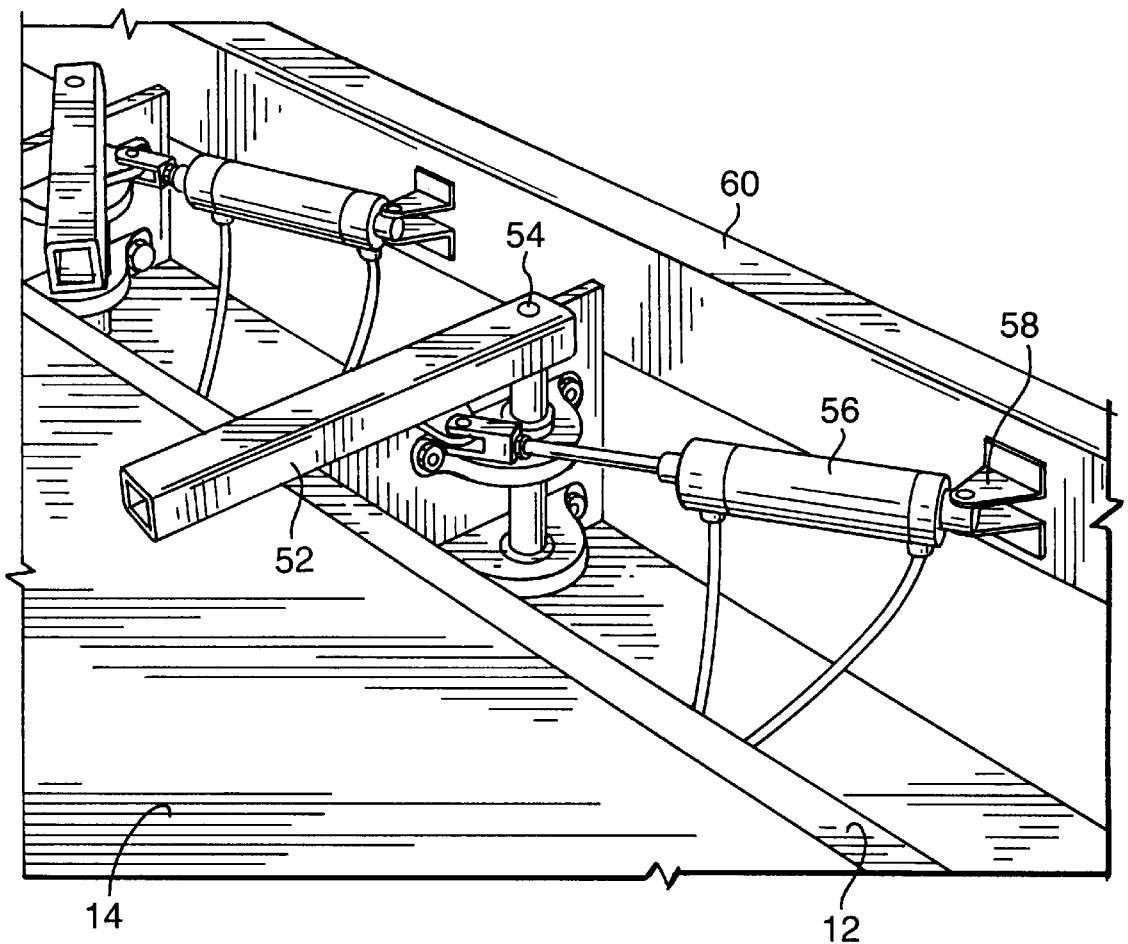
FIG. 4 is a perspective view illustrating the construction details of the extensible, rotating arms used in the system of the present invention.

Reference is now made to the rotational mechanism illustrated on the right-hand section of FIG. 1 and in FIG. 4. This rotating mechanism includes an extensible arm 52 extending along the side 18 opposite the first side 16 of the primary conveyor 12, each arm 52 being rotated about a pivot 54 defining an axis which is generally normal to the plane of the first conveyor 12, but away from its second side 18 so that the arm may be extended entirely out of the path of the boxes 30 moving along the primary conveyor 12. Each extensible arm 52 is operated by a hydraulic cylinder 56 which in turn is mounted at a pivot 58 mounted to a brace 60 extending generally parallel with the second side 18 of the primary conveyor 12. Each of the hydraulic cylinders 56 has an associated hydraulic line 61 and hydraulic valve 62 which is controlled by inputs 64 from the controller and sequencer. It will of course be appreciated by those skilled in the art that the inputs 64 are calculated based upon the time in which the forward edge 32 of each box 30 passes through the detectors 24, 26, the distance between the fixed point defined by the detectors and a specific extensible arm 52, and the individual arm 52 to be operated, as determined by the evaluation of the bar code sticker 36 on each box 30. A particularly important feature of the present invention is the ability to dispose the sorting conveyors 40A–40N in a highly dense configuration, which conserves space, while permitting the sorting of a large number of different articles onto respective sorting conveyors in a rapid and facile manner. Further, as will be appreciated from a review of the elongated boxes illustrated in FIG. 1, the present invention is particularly suited for use with boxes and other containers having a lengthwise dimension which is greater that a cross-width dimension generally lateral to the lengthwise dimension, because the primary conveyor 12 can be easily dimensioned between the opposing sides 16, 18 so that the boxes 30 fit within the sides of the primary conveyor while travelling with the lengthwise dimension generally parallel to that first direction, but with the lateral dimension of the primary conveyor being substantially less than the lengthwise dimension of the boxes. Thus, after rotation of the boxes travelling along the first direction of the primary conveyor taxes place, it can be easily seen that the frictional rollers 46 can very rapidly eject the elongated boxes off of the primary conveyor and onto the associated sorting conveyor without any interference with the oncoming boxes behind the one being ejected. This further enhances the ability of the system to rapidly convey and sort articles moving along the primary conveyor in large quantities. It will also be appreciated that the system and method of the present invention significantly reduces the amount of potential damage to the conveyed articles and also reduces energy consumption requirements, with respect to the hydraulic ram systems of the prior art.

This concludes the description of the preferred embodiments. A reading by those skilled in the art will bring to mind various changes without departing from the spirit and scope of the invention. It is intended, however, that the invention only be limited by the following appended claims.

What is claimed is:

1. A method for conveying and sorting plural, generally rectangular articles each of which includes opposing sides extending generally parallel with a first direction, each article further including opposing front and rear faces between the opposing sides with the front face extending toward the first direction and with a corner at the intersection of each face and each side, the method comprising the steps of:

provdiing a primary conveyor for conveying the articles in the first direction and a plurality of sorting conveyors extending generally laterally to the first direction;

positioning a feed end of each of the sorting conveyors adjacent a first side of the primary conveyor;

selectively extending an arm having a lateral dimension substantially less than the width of the primary conveyor from a second side of the primary conveyor to engage with the extremity of the arm each article only at a rotation corner between the front face and the article side adjacent the second side of the primary conveyor so as to initially rotate each article through substantially more than 45° about an axis extending generally normal to the primary conveyor adjacent the extremity of the arm before the rotation corner is substantially translated laterally toward one of the sorting conveyors in order that the rear face of the article is presented first to the feed end of a selected one of the sorting conveyors; and thereafter conveying each rotated article along the selected sorting conveyor.

2. The method recited in claim 1 further comprising the step of briefly conveying each article further along the primary conveyor after completing the rotation step caused by engagement of the extending arm, so as to complete rotational translation of the rear face, such further brief conveying along the primary conveyor without engagement of the extending arm.

* * * * *